US009419424B2

(12) United States Patent
Karnbach et al.

(10) Patent No.: US 9,419,424 B2
(45) Date of Patent: Aug. 16, 2016

(54) SWITCHGEAR BUS SUPPORT BUSHING STRUCTURE

(75) Inventors: Robert S. Karnbach, Lake Mary, FL (US); Harshavardhan M. Karandikar, Longwood, FL (US); Rahul Pawar, Lake Mary, FL (US)

(73) Assignee: ABB Schweiz AG, Zurich (CH)

( * ) Notice: Subject to any disclaimer, the term of this patent is extended or adjusted under 35 U.S.C. 154(b) by 310 days.

(21) Appl. No.: 14/237,573

(22) PCT Filed: Aug. 3, 2012

(86) PCT No.: PCT/US2012/049412
§ 371 (c)(1),
(2), (4) Date: Feb. 7, 2014

(87) PCT Pub. No.: WO2013/028331
PCT Pub. Date: Feb. 28, 2013

(65) Prior Publication Data
US 2014/0182930 A1 Jul. 3, 2014

Related U.S. Application Data

(60) Provisional application No. 61/526,700, filed on Aug. 24, 2011.

(51) Int. Cl.
*H02G 5/06* (2006.01)
*H02G 5/02* (2006.01)
(Continued)

(52) U.S. Cl.
CPC ............. *H02G 5/068* (2013.01); *H01B 17/301* (2013.01); *H02G 1/06* (2013.01); *H02G 5/025* (2013.01); *Y10T 29/49117* (2015.01)

(58) Field of Classification Search
None
See application file for complete search history.

(56) References Cited

U.S. PATENT DOCUMENTS

| 757,583 | A | * | 4/1904 | Wallace | .................. E01C 19/27 404/126 |
| 2,936,331 | A | | 5/1960 | Sillers | |
| 3,793,562 | A | * | 2/1974 | Cleaveland | .......... H02B 11/167 174/152 R |

(Continued)

FOREIGN PATENT DOCUMENTS

| CH | 363386 A | 7/1962 |
| FR | 1387824 A | 2/1965 |
| FR | 2835960 A1 | 8/2003 |

OTHER PUBLICATIONS

International Search Report a & Written Opinion in PCT/US12/49412, dated Nov. 12, 2012.

*Primary Examiner* — Jeremy C Norris
*Assistant Examiner* — Muhammed Azam
(74) *Attorney, Agent, or Firm* — Manelli Selter PLLC; Edward J. Stemberger

(57) ABSTRACT

A bushing structure for switchgear includes first and second separate support structures each having surfaces defining at least one opening. The support structures are coupled together so that the openings define a passage through the bushing structure and so that a slot is defined between the first and second support structures, surrounding the passage. A bushing is disposed in the passage and has a body, a bus receiving member, and a compression structure. The bus receiving member has an opening there-through sized to receive a bus bar. When the first and second support structures are coupled together with the bushing in the passage, the compression structure is disposed in the slot, sandwiched between the first and second support structures so that they exert pressure on the compression structure.

15 Claims, 6 Drawing Sheets

(51) Int. Cl.
*H02G 1/06* (2006.01)
*H01B 17/30* (2006.01)

(56) References Cited

U.S. PATENT DOCUMENTS

| | | | | |
|---|---|---|---|---|
| 4,208,543 A * | 6/1980 | Boyle | H01B 17/26 | 174/149 B |
| 4,249,353 A * | 2/1981 | Berry | F16L 5/04 | 174/151 |
| 4,764,422 A * | 8/1988 | Hill | H01B 1/22 | 428/309.9 |
| 5,227,587 A * | 7/1993 | Paterek | H01B 17/305 | 174/151 |
| D404,707 S * | 1/1999 | Awbrey | D13/133 | |
| 5,925,852 A * | 7/1999 | Hinz | H01B 17/30 | 174/652 |
| 6,150,607 A * | 11/2000 | Weyl | H01B 17/308 | 16/2.1 |
| 6,844,502 B2 * | 1/2005 | Deng | H01B 17/30 | 174/151 |
| 8,096,838 B2 * | 1/2012 | Dilmaghanian | A61N 1/3752 | 439/669 |
| 8,124,874 B2 * | 2/2012 | Blatter | H02G 5/068 | 174/139 |
| 8,378,221 B2 * | 2/2013 | Bernauer | H01B 17/305 | 174/152 GM |
| 8,681,481 B2 * | 3/2014 | Patten | H02B 11/04 | 312/223.6 |
| 2001/0044984 A1 * | 11/2001 | Ono | B60R 16/0222 | 16/2.5 |
| 2001/0055906 A1 * | 12/2001 | Morlesin | H01R 13/53 | 439/502 |
| 2002/0023769 A1 | 2/2002 | Pioch | | |
| 2003/0234115 A1 * | 12/2003 | Deng | H01B 17/30 | 174/564 |
| 2005/0067182 A1 * | 3/2005 | Mahn | H02G 5/025 | 174/659 |
| 2006/0000630 A1 * | 1/2006 | Hemingway | H02G 3/22 | 174/58 |
| 2006/0027388 A1 * | 2/2006 | Collins | F16L 5/02 | 174/663 |
| 2009/0108146 A1 * | 4/2009 | Svette, Jr. | F16L 5/02 | 248/56 |
| 2010/0163280 A1 * | 7/2010 | Sasaki | F16L 5/10 | 174/152 R |
| 2012/0255920 A1 * | 10/2012 | Shaw | H02B 5/02 | 211/26 |
| 2014/0008122 A1 * | 1/2014 | Imahori | H01B 17/308 | 174/77 R |
| 2014/0027154 A1 * | 1/2014 | Imahori | H01B 9/006 | 174/135 |
| 2014/0299369 A1 * | 10/2014 | Andresen | H02G 3/085 | 174/668 |
| 2015/0083487 A1 * | 3/2015 | Leedecke | H01B 17/305 | 174/659 |

* cited by examiner

SWITCHGEAR BUS SUPPORT BUSHING STRUCTURE

FIELD OF THE INVENTION

The invention relates to switchgear and, more particularly, a bushing structure that supports a current carrying bus as it passes from one switchgear frame to another.

BACKGROUND OF THE INVENTION

High currents in switchgear are carried using thick copper bars (the bus) of varying cross-sections. The main bus of the switchgear runs the entire length of the switchgear. The bus is always coated with an insulating layer (epoxy coating or shrink wrap coating). As the bus extends from one switchgear frame to another, the bus needs to be structurally supported. Additionally, the structural support needs to be such that if there is an internal arc fault in the bus compartment of a frame, the arc gasses do not freely flow into the adjoining compartment. This is a difficult requirement since the arc pressures generated are quite high. Some leakage is permissible into the adjoining compartment but then, there should be zero gas intrusion into the next compartment.

An example of a conventional a bushing structure is shown in FIG. 1, where the bushing structure 10 is mounted to an outside surface of a switchgear frame 12 using a plurality screws 16 engaged with a plurality of Tinnerman nuts 18. Thus, the bushing 10 is sandwiched between the switchgear frames 12 and 14. The bushing structure 10 includes three bushings 20, each having a through-hole 22 for receiving a current carrying bus (not shown). The bushings 20 make it possible to pass the buses through openings 24 of the frames 12 and 14. The bushing structure 10 is made of molded glass epoxy and once assembled, the configuration relies on using putty or sealing material to close the gap between the bus and the bushing 16. Additionally, due to BIL and heat rise considerations, porcelain bushings are required for ratings of 3000 A and above. This multi-piece bushing structure 10 makes assembly difficult and tedious and also makes it difficult to control the quality of the final assembly.

Thus, there is a need for a bushing structure that is of simple configuration, is easy to assembly, and has improved quality.

SUMMARY OF THE INVENTION

An object of the invention is to fulfill the need referred to above. In accordance with the principles of the present invention, this objective is obtained by providing bushing structure for mounting to a switchgear frame and for supporting bus bars. The bushing structure includes first and second separate support structures, each having surfaces defining at least one opening. The support structures are coupled together so that the openings cooperate to define at least one passage through the bushing structure and so that a slot is defined between the first and second support structures, surrounding the passage. A bushing is constructed and arranged to be disposed in the passage. The bushing has a body, at least one bus receiving member, and a compression structure surrounding the at least one bus receiving member. The bus receiving member has an opening therethrough sized to receive a bus bar. When the first and second support structures are coupled together with the bushing in the passage, the compression structure is disposed in the slot, sandwiched between the first and second support structures so that the first and second support structures exert pressure on the compression structure.

In accordance with another aspect of an embodiment, a method of supporting bus bars for a switchgear provides first and second separate support structures each having surfaces defining at least one opening. A bus bar is inserted into an opening of the first support structure. A bushing is provided having a body, at least one bus receiving member, and a compression structure surrounding the bus receiving member. The bus receiving member has an opening therethrough. An end of the bus bar is inserted into the opening in the bus receiving member. The end of the bus bar is inserted into an opening in the second support structure. The support structures are coupled together so that the openings in the support structures cooperate to define at least one passage, with the bus bar extending through the passage, and so that a slot is defined between the first and second support structures that surrounds the passage, with the compression structure being disposed in the slot, sandwiched between the first and second support structures so that the first and second support structures exert pressure on the compression structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 1:
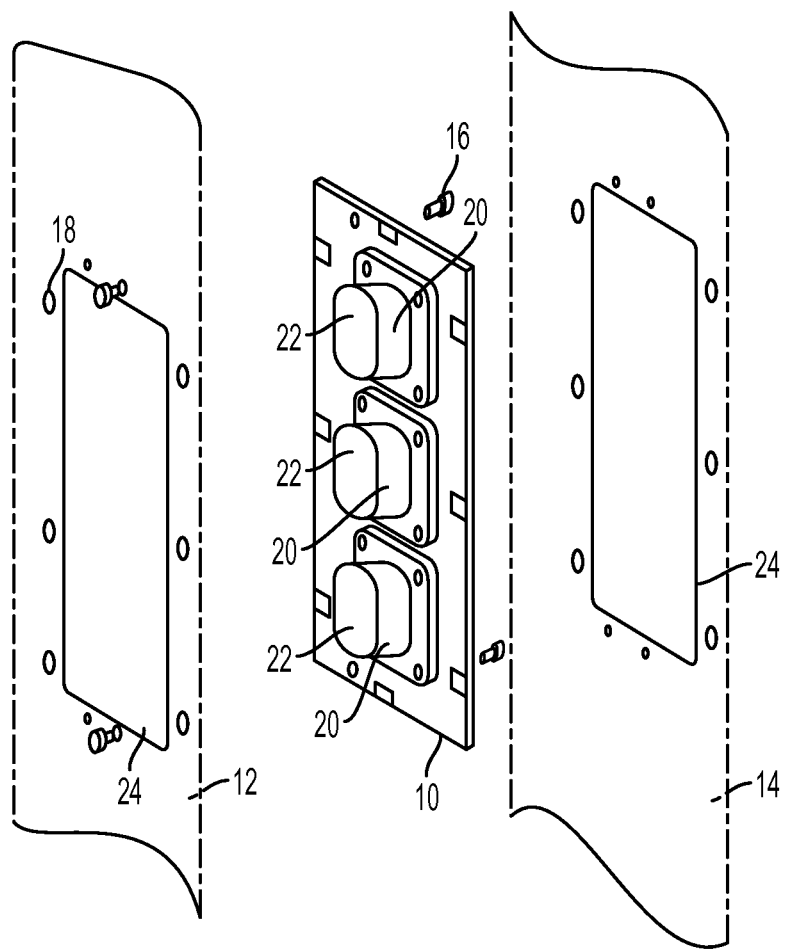
FIG. 1 is an exploded view of a convention bushing structure shown being mounted to switchgear frames.
Figure 2:
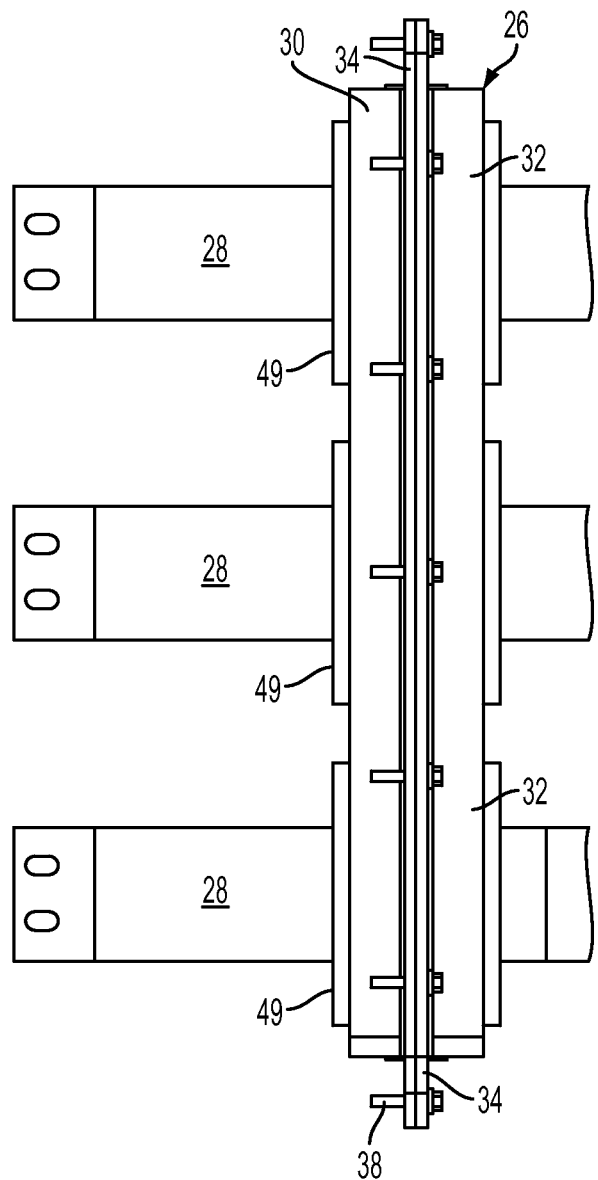
FIG. 2 is a side view of bushing structure in accordance with an embodiment of the invention, shown supporting bus bars.
Figure 3:
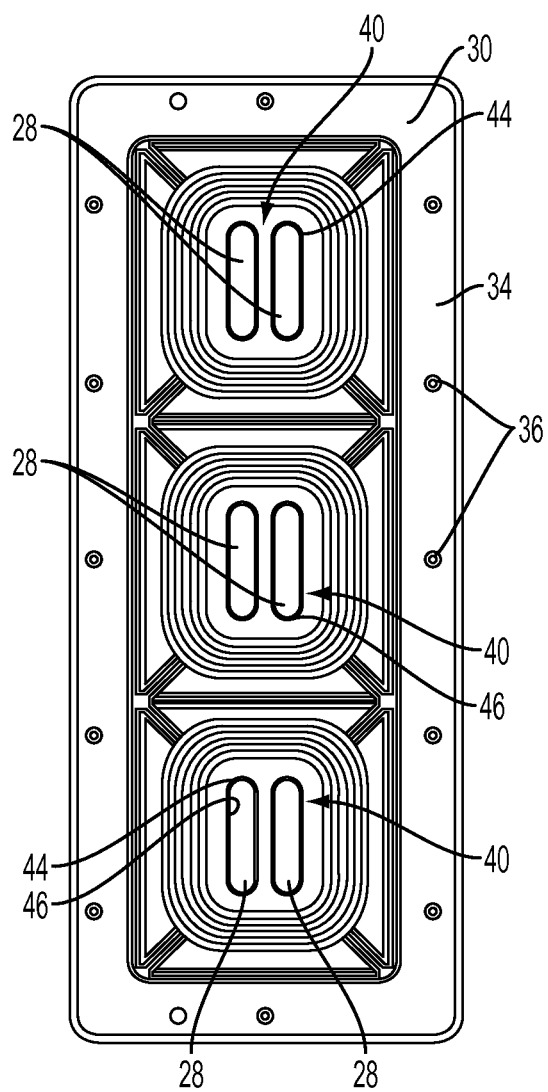
FIG. 3 is an end view of the bushing structure and bus bars of FIG. 2.

With reference to FIG. 2, a bushing structure is shown, generally indicated at 26, in accordance with an embodiment of the invention supporting a plurality of bus bars 28. The bushing structure 26 includes a first support structure 30 and a second, support structure 32 that is a mirror image of the first support structure 30. Each support structure 30 and 32 has a flange 34 with a plurality of mounting holes 36 therein. The support structures 30 and 32 are coupled together by fasteners, such as screws 38 or the like, engaged with the holes 36 so that flange surfaces abut. Thus support structures 30, 32, when joined, can be mounted to a switchgear frame as will be explained more fully below.

Figure 4:
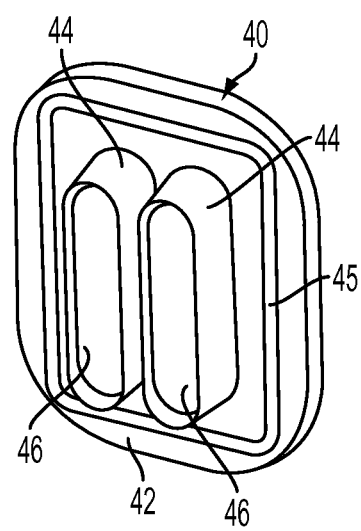
FIG. 4 is a view of a bushing of the bushing structure of FIGS. 2 and 3.

With reference to FIGS. 3-6, the bushing structure 26 also comprises a plurality of bushings, generally indicated at 40, having a portion that is sandwiched between the support structures 30, 32. As best shown in FIG. 4, each bushing 40 is made preferably of rubber, such as ethylene propylene diene monomer (EPDM). Each bushing 40 includes a body 42 and at least one bus receiving member 44. In the embodiment, a pair of bus receiving members are shown disposed in spaced relation and isolated from each other. The number of bus receiving members 44 (one or two) is based on the amperage rating of the main bus. Each bushing 40 includes compression structure 45 surrounding both of the bus receiving members 44 (when two are provided). In the embodiment, the compression structure 45 is a rib provided on each of the opposing sides of the body 42. Each bus receiving member 44 extends from opposing sides of the body and includes an opening 46 there-through constructed and arranged to receive a bus bar 28 therein. The isolated bus receiving members 44 ensure greater resistance to the possibility of arc gasses flowing from one compartment to another. If gasses pass through the bushing structure 26 mounted on one compartment, the receiving members 44 of a bushing 40 mounted on the other compartment is likely to trap any gasses due to natural differences in tolerances.

Figure 5:
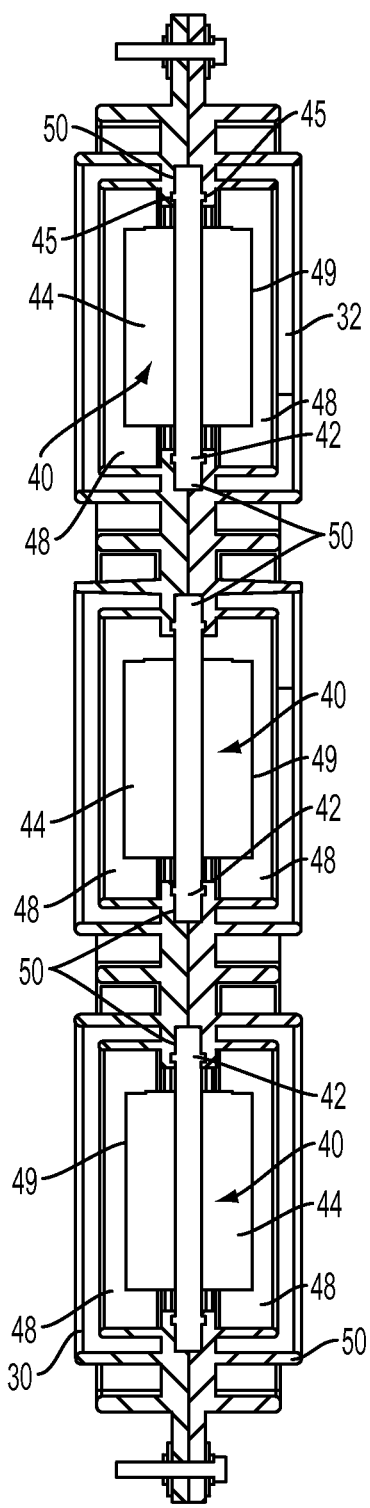
FIG. 5 is a sectional view of the bushing structure of FIG. 3 showing bushings sandwiched between support structures and with the bus bars removed.
Figure 6:
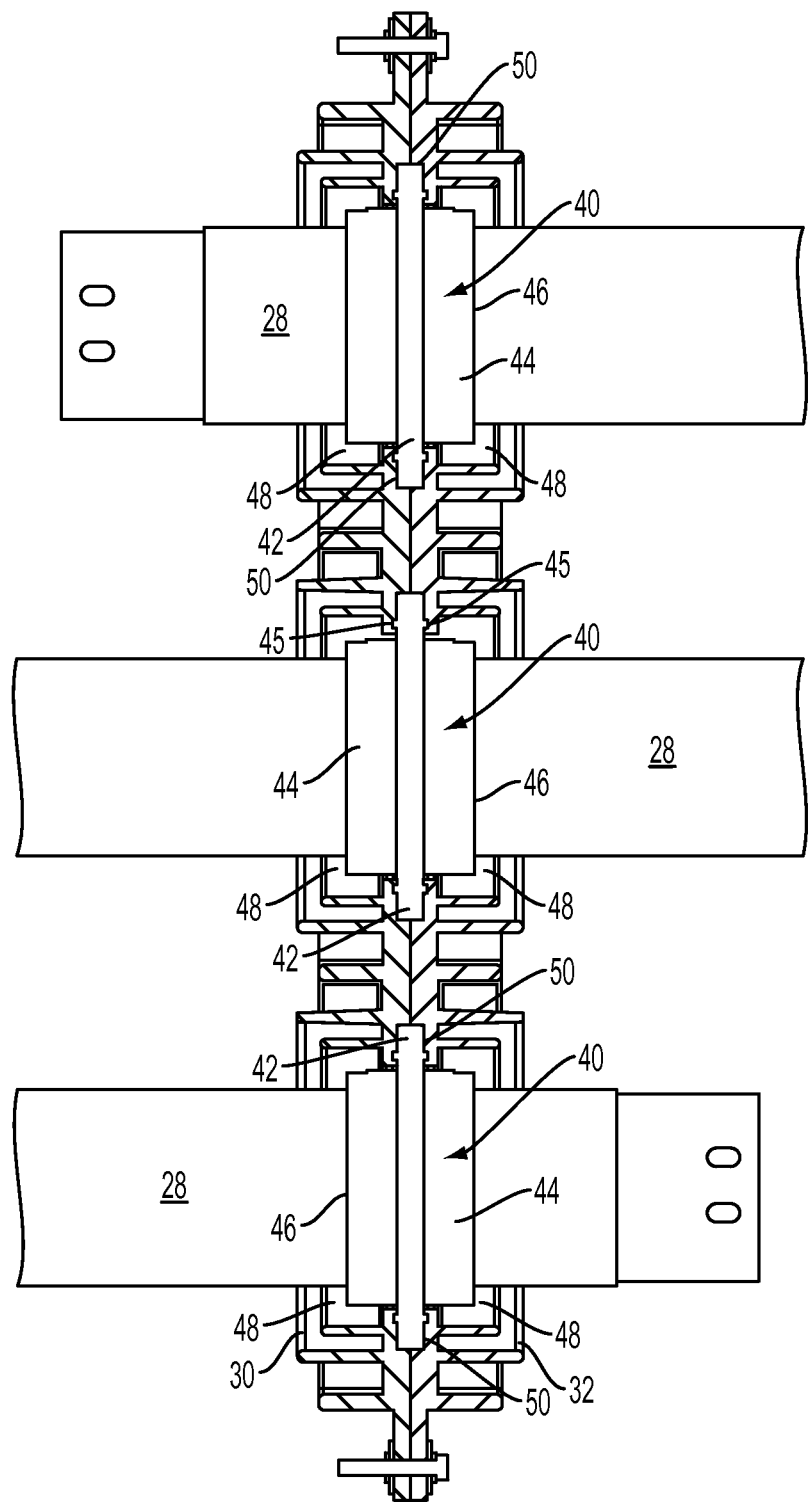
FIG. 6 is a sectional view of the bushing structure of FIG. 3, shown with bushings sandwiched between support structures and bus bars received in the bushings.

FIG. 5 is a sectional view showing a bushing 40 disposed in an associated opening 48 through the first and second support members 30, 32. When the support structures 30, 32 are joined, adjacent openings 48 cooperate to define a passage 49 (FIG. 2) through the bushing structure 26. A portion of the body 42, including the ribs 45 of each bushing 40, is received in a slot 50 defined by the support structures 30, 32 when coupled. Thus, when joined together, the first and second support structures 30, 32 sandwich the ribs 45 in an associated slot 50. A slot 50 is associated with each passage 49, surrounding each passage 49. Advantageously, when assembled, the first and second support structures 30, 32 exert a slight pressure on the ribs 45, providing a very good seal around the bus bar 28 when received an opening 46 of the bushing 40. FIG. 6 is a sectional view, showing the bushings 40 receiving bus bars 28.

Figure 7A:
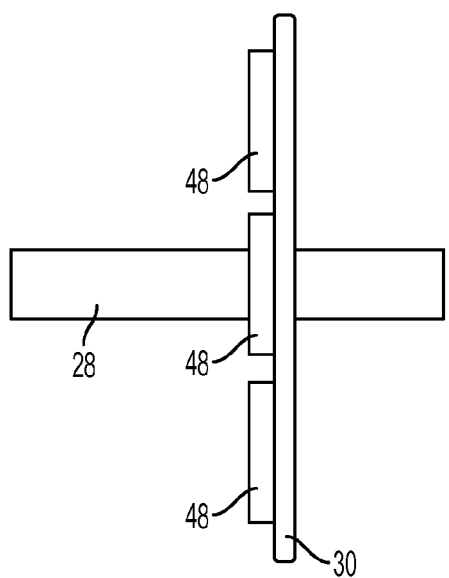
FIG. 7a shows a first step of assembling the bushing structure of the embodiment with bus bars and mounting the bushing assembly to a wall of a switchgear.
Figure 7B:
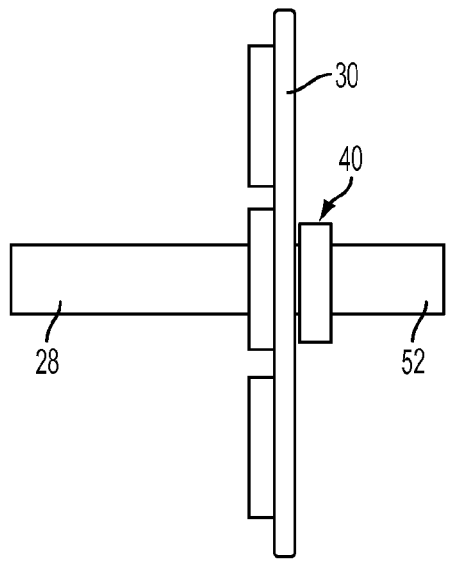
FIG. 7b shows a second step of assembling the bushing structure of the embodiment with bus bars and mounting the bushing assembly to a wall of a switchgear.
Figure 7C:
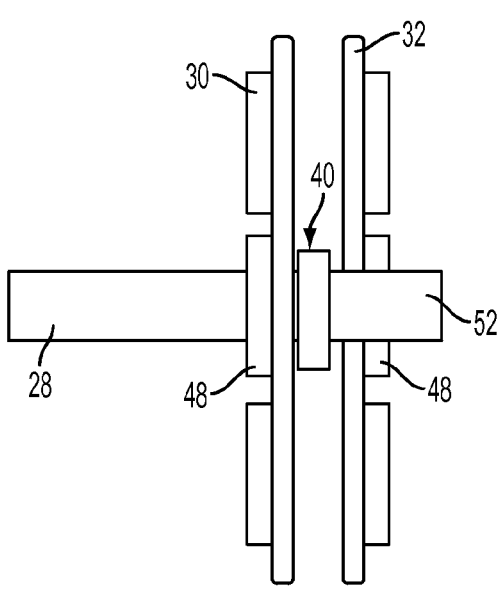
FIG. 7c shows a third step of assembling the bushing structure of the embodiment with bus bars and mounting the bushing assembly to a wall of a switchgear.
Figure 7D:
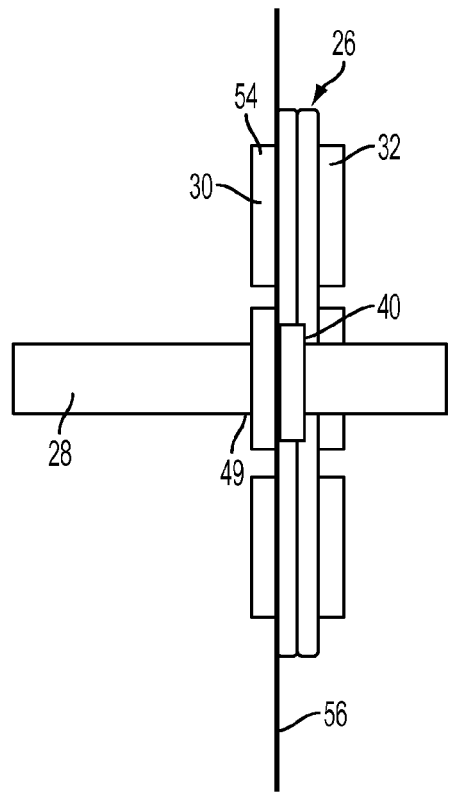
FIG. 7d shows a final step of assembling the bushing structure of the embodiment with bus bars and mounting the bushing assembly to a wall of a switchgear.

FIGS. 7a-7d show the process of assembly the bushing structure to receive a bus bar and then to be mounted to a switchgear compartment wall. FIG. 7a shows a preferably epoxy coated copper bus bar 28 disposed in an opening 48 of the first support structure 30. In FIG. 7b, an end 52 of the bus bar 28 is received in an opening 46 of a bushing 40 and the bushing 40 is moved to be generally adjacent to the first support structure. FIG. 7c shows the end of the bus bar 28 being received in an opening 48 in the second support structure 32. The steps shown in FIG. 7a-7c can be repeated to inert a second bus bar 28 (if provided) in another opening 46 (when provided) in the bushing 40. As shown in FIG. 7d, the first and second support structures 30, 32 are coupled together with screws as noted above, thereby sandwiching the bushing 40 therebetween. Then, the bushing structure 26 can be mounted so that the bus bar 28 extends through an opening 54 in a switchgear frame wall 56. Alternatively, on the assembly floor, the bushing structure is assembled as shown in FIG. 2, but without the bus bars 28. The assembled unit is then is mounted on the switchgear inside wall and the bus bars 28 are inserted through the openings 46.

The bushing structure 26 provides a simpler construction than conventional bushing structures, is easier to assemble, and also allows the use a single configuration (and material) for all current ratings. In additional the use of the rubber bushing 40 enables the switchgear to withstand shock and vibration during transportation.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A bushing structure for mounting to a switchgear frame and for supporting bus bars, the bushing structure comprising:
   first and second separate support structures each having surfaces defining at least one opening, the support structures being coupled together so that the openings cooperate to define at least one passage through the bushing structure and so that a slot is defined between the first and second support structures, surrounding the passage, and
   a bushing constructed and arranged to be disposed in the passage, the bushing having a body, at least one bus receiving member, and a compression structure surrounding the at least one bus receiving member, the bus receiving member having an opening there-through sized to receive a bus bar,
   wherein, when the first and second support structures are coupled together with the bushing in the passage, the compression structure is disposed in the slot, sandwiched between the first and second support structures so that the first and second support structures exert pressure on the compression structure.

2. The bushing structure of claim 1, wherein the bushing includes a pair of bush receiving members that are provided in spaced relation and isolated from each other, each bus receiving member having an opening there-through sized to receive a bus bar, and wherein the compression surrounds the pair of bus receiving members.

3. The bushing structure of claim 1, wherein the compression structure comprises a continuous, raised rib provided each of opposing sides of the body.

4. The bushing structure of claim 1, further comprising a bus bar disposed in the opening in the at least one bus receiving member.

5. The bushing structure of claim 1, wherein first and second separate support structures each having surfaces defining three separate passages, with a bushing being disposed in each passage.

6. The bushing structure of claim 1, wherein the bushing is made of rubber.

7. The bushing structure of claim 1, wherein the bushing is made of ethylene propylene diene monomer (EPDM).

8. The bushing structure of claim 1, wherein the second support structure is a mirror image of the first support structure.

9. The bushing structure of claim 1, wherein the at least one bus receiving member extends from opposing sides of the body.

10. A method of supporting bus bars for a switchgear, the method comprising: providing first and second separate support structures each having surfaces defining at least one opening, inserting a bus bar into an opening of the first support structure, providing a bushing having a body, at least one bus receiving member, and a compression structure surrounding the bus receiving member, the bus receiving member having an opening there-through, inserting an end of the bus bar into the opening in the bus receiving member, inserting the end of the bus bar into an opening in the second support structure, coupling the support structures together so that the openings in the support structures cooperate to define at least one passage, with the bus bar extending through the passage, and so that a slot is defined between the first and second support structures that surrounds the passage, with the compression structure being disposed in the slot, sandwiched between the first and second support structures so that the first and second support structures exert pressure on the compression structure.

11. The method of claim 10, wherein the step of providing the bushing provides the bushing of rubber.

12. The method of claim 10, wherein the step of providing the bushing provides the bushing of ethylene propylene diene monomer (EPDM).

13. The method of claim 10, wherein the step of providing the first and second support structures provides the second support structure as a mirror image of the first support structure.

14. The method of claim 10, wherein the step of coupling the first and second support structures includes using fasteners.

15. The method of claim 10, further comprising after the coupling step, mounting the coupled first and second support structures to a wall of a switchgear.

\* \* \* \* \*